(12) United States Patent
Ooe

(10) Patent No.: US 6,464,409 B1
(45) Date of Patent: Oct. 15, 2002

(54) PACKAGE FOR OPTICAL COMMUNICATIONS MODULES

(75) Inventor: Satoshi Ooe, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 77 days.

(21) Appl. No.: 09/678,809

(22) Filed: Oct. 4, 2000

(30) Foreign Application Priority Data

Oct. 8, 1999 (JP) ............................................ 11-287842

(51) Int. Cl.[7] ................................................. G02B 6/42
(52) U.S. Cl. ........................................... 385/88; 385/92
(58) Field of Search .................................... 385/88, 92

(56) References Cited

U.S. PATENT DOCUMENTS 4,715,674 A * 12/1987 Shulz et al. ............. 350/96.21
5,825,054 A * 10/1998 Lee et al. ..................... 257/98

FOREIGN PATENT DOCUMENTS

| JP | 06082659 A | 3/1994 |
|----|------------|--------|
| JP | 06314747 A | 11/1994 |

* cited by examiner

Primary Examiner—Georgia Epps
Assistant Examiner—Richard Hanig
(74) Attorney, Agent, or Firm—McDermott, Will & Emery

(57) ABSTRACT

Packages are required to have high heat-dissipating quality. To fulfill this requirement, a highly heat-conductive material has been used for a package's bottom plate. This results in the use of a material that has a considerable difference in the coefficient of linear expansion between the side plate and bottom plate. Notwithstanding the use of this type of material, the package must be free from reduction in airtightness and degradation in optical coupling. The package of the present invention comprises side plate 1 and bottom plate 2 each having tenons 3. The tenon portions are combined and bonded. It is desirable that tenons 3 have a width not less than 1 mm and not more than 5 mm.

11 Claims, 4 Drawing Sheets

(a)

(b)

PACKAGE FOR OPTICAL COMMUNICATIONS MODULES

BACKGROUND OF THE INVENTION

1. Field of the Invention

The present invention relates to a package for optical communications modules (hereinafter called a package) for use in optical communications, radio communications, etc.

2. Description of the Background Art

As shown in FIGS. 4(a) and 4(b), a conventional package 20 comprises a side plate 21, two alumina members 28 (the alumina member at the other side is not shown.), a bottom plate 22, and a lid 23, which are assembled by soldering to hermetically seal the device housed inside. The bottom plate 22 has an extra length on both sides to provide holes 27 for fixing the package 20 to a printed substrate or a heat sink (not shown) by screws.

Usually, the bottom plate 22 of the package 20 is made of a Cu—W alloy, having high thermal conductivity, in order to dissipate the heat generated inside the package effectively to the outside. The side plate 21 is usually made of an Fe—Ni—Co alloy (brand name Kovar, for instance), which has a coefficient of linear expansion close to that of the bottom plate 22.

Recently, however, the miniaturization and performance enhancement of electronic equipment have increased the consumption power of ICs used in electronic equipment and the output of light emitting diodes (LEDs) and laser diodes (LDs) used as the device for optical communications. This increase requires the package 20 that houses the device to increase its heat-dissipating power further. In order to meet this requirement, when the bottom plate 22 is made of a material that has higher thermal conductivity than the Cu—W alloy, such as SiC, the difference in the coefficient of linear expansion between the side plate 21 and the bottom plate 22 is increased. This is because whereas SiC has a smaller coefficient of linear expansion than the conventional material, the conventional material is still used as the side plate 21 because a suitable material that has a coefficient of linear expansion comparable to SiC is yet to be found.

If the package 20 has a considerable difference in the coefficient of linear expansion between the side plate 21 and the bottom plate 22, the following problems may arise:

(a) Warping of the bottom plate 22:

When the side plate 21 and the bottom plate 22 of the package 20 are soldered, the difference in the coefficient of linear expansion between the two plates produces a thermal distortion, producing a permanent warp of several to several tens of micrometers to the bottom plate 22. When the package 20 having this warp is fixed to a printed board or a heat sink through the fixing holes 27 by screws, the aforementioned warp is straightened by force. This breaks the optical coupling between the LD 24 and the optical fiber 26 via the lens 25, so that the light excited by the LD 24 cannot be transmitted satisfactorily to the outside through the optical fiber 26.

(b) Repeated thermal stresses applied to the bonding portion between the side plate 21 and the bottom plate 22:

When the device in the package 20 repeats heat generation by its operation and cooling by the discontinuation of its operation, the bonding portion between the side plate 21 and the bottom plate 22 is subjected to repeated thermal stresses. The repeated thermal stresses cause the bonding portion to produce minute cracks or other abnormalities, which in turn break the hermeticity of the package 20. As a result, the properties of the device will deteriorate and subsequently lose its reliability.

On the other hand, packages housing devices have been required to have further increased heat-dissipating quality. Consequently, this requires he bottom plate of a package to be made of a material that has higher thermal conductivity than the conventional one, increasing the difference in the coefficient of linear expansion between the side plate and the bottom plate.

SUMMARY OF THE INVENTION

An object of the present invention is to offer a package that will not break its hermetic seal or impair the optical coupling between the optical devices even when the package comprises a side plate and a bottom plate that are made of materials having a relatively great difference in the coefficient of linear expansion.

The package of the present invention is formed by combining a side plate and a bottom plate, each having a different coefficient of linear expansion, both provided with tenons at their bonding portion. The tenon portions are matched together, and the bonding portion is soldered. When materials having a different coefficient of linear expansion are bonded, the rise and reduction in temperature may cause the material to warp or the bonding portion to generate minute cracks resulting from the repeated thermal stresses. The foregoing tenon structure is to prevent these problems.

It is desirable that the tenons have a width not less than 1 mm and not more than 5 mm. The effect will increase when a large number of tenons having a small width are provided. However, it is desirable to provide tenons having a width not less than 1 mm considering the manufacturing difficulty and cost and not more than 5 mm considering the effect.

As described above, packages have been required to further increase their heat-dissipating quality. To meet this requirement, the bottom plate of a package must necessarily be made of a material having excellent thermal conductivity. As a result, materials having a considerable difference in the coefficient of linear expansion between the package's side plate and bottom plate have been used. This may result in permanent warpage to the bottom plate after the soldering and generate cracks at the bonding portion resulting from repeated thermal stresses.

In order to solve these problems, the present invention offers a package that has a tenon structure at the bonding portion between the side plate and bottom plate. The package is assembled by soldering the combined tenon portions. The package suppresses the generation of the aforemeetioned warp, is free from cracks caused by repeated thermal stresses, has excellent performance, and therefore is highly reliable.

DESCRIPTION OF THE PREFERRED EMBODIMENTS

Figure 4:
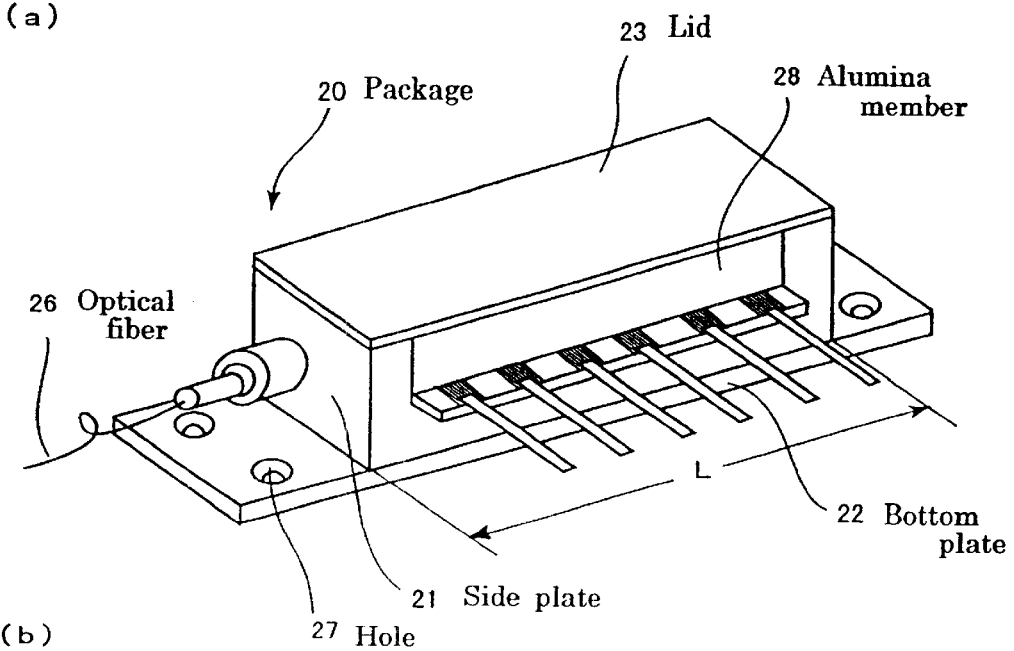
FIG. 4 is a diagram illustrating the conventional package.
Figure 4:
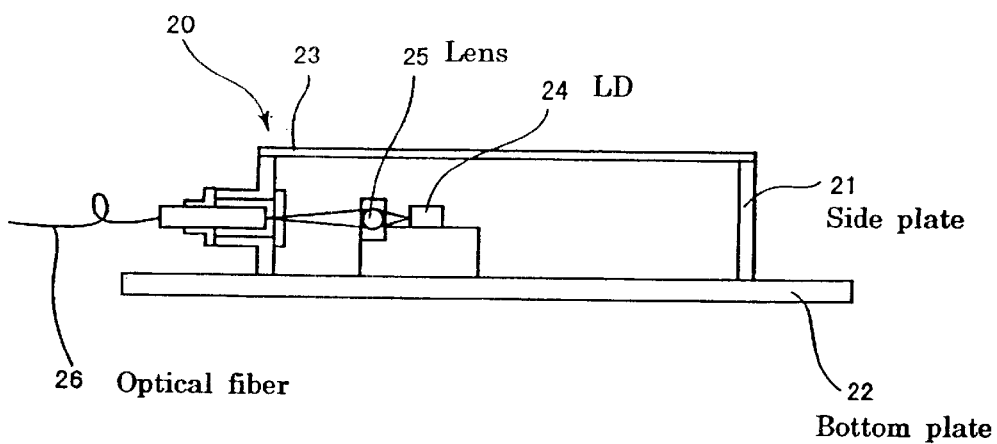

The present invention's superiority to the conventional product is explained below. The conventional method produces the package by soldering a side plate 21 and a bottom plate 22 as shown in FIGS. 4(a) and 4(b). Only one side of the bottom plate 22 (the upper surface in the figure) has the soldering surface across the entire length of L. Consequently, the difference in the coefficient of linear expansion between the side plate 21 and the bottom plate 22 causes the bottom plate 22 to generate a permanent warp after the soldering or applies repeated thermal stresses of tension and compression to the one side of the bottom plate 22 as the package temperature rises or falls.

Figure 1:
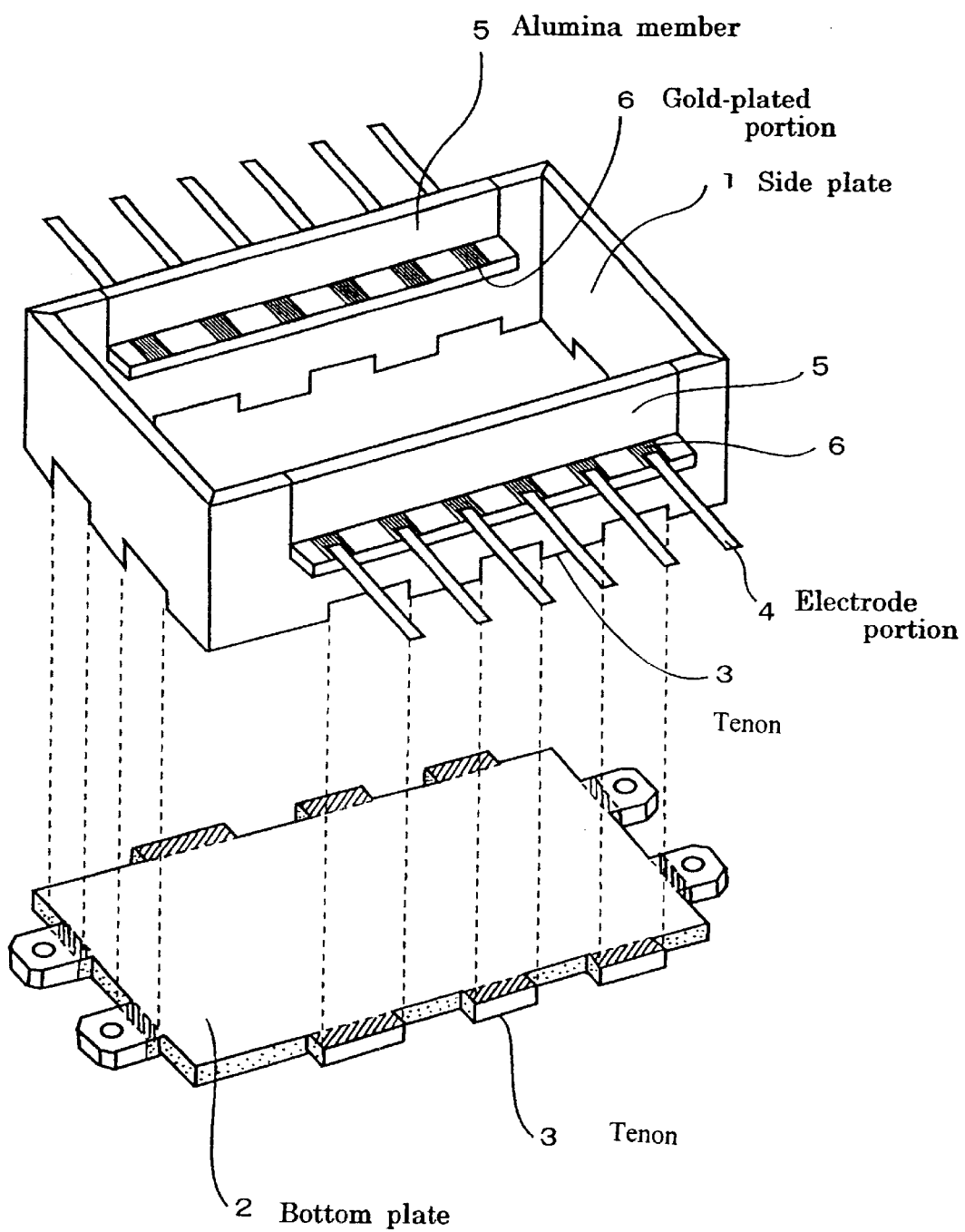
FIG. 1 is a perspective view illustrating the tenons provided at the bottom plate and the side plate of the package of the present invention.

As opposed to the conventional method, the present invention has the following advantages:

(a) As shown in FIG. 1, the soldering portions between the side plate 1 and the bottom plate 2 are the hatched portions and the dotted portions. The total length of the hatched portions on one side of the bottom plate 2 (the upper surface in the figure) is less than half that of the conventional product. It can be seen clearly that, the hatched portions are provided at specific intervals.

Figure 2:
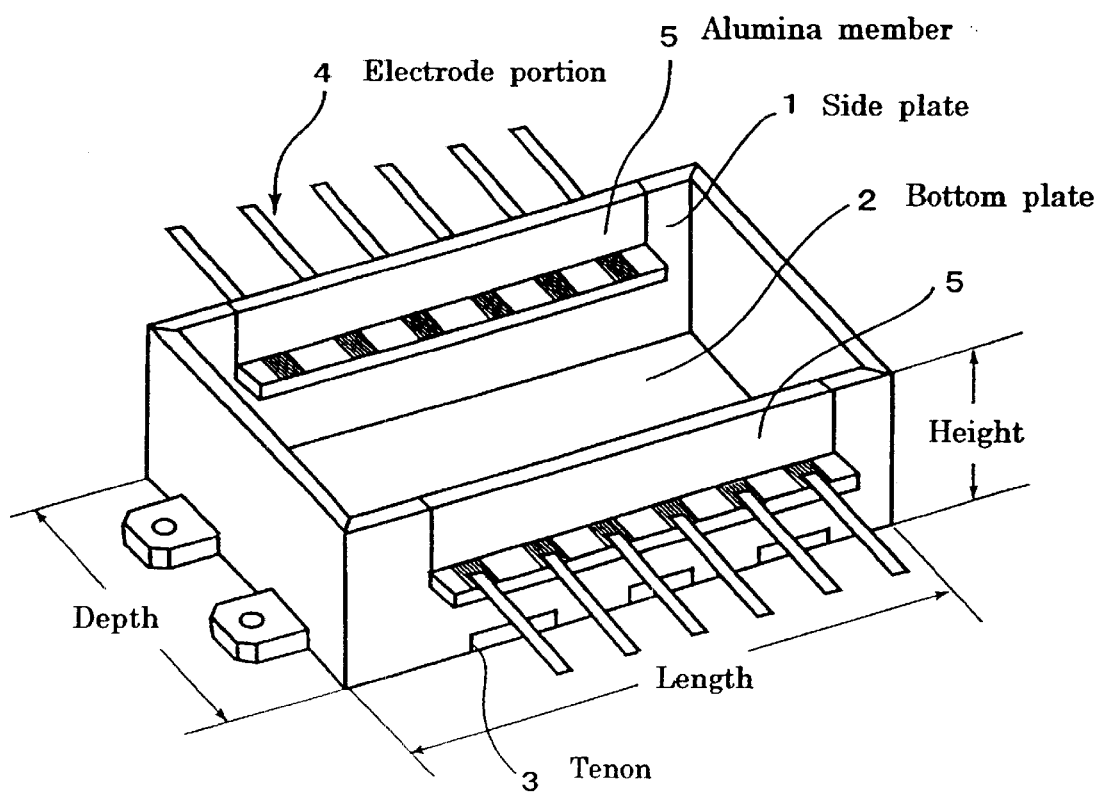
FIG. 2 is a perspective view illustrating the soldered bottom plate and side plate, each having the tenons, of the present invention.

(b) As shown in FIG. 2, the side plate 1 and the bottom plate 2 are mutually constrained at the tenon portions.

(c) As shown by the dotted portions in FIG. 1, bonding surfaces are also provided at the side faces of the bottom plate 2 in order to suppress the warp.

The above advantages not only reduce considerably the warpage produced on the bottom plate 2 after the soldering but also reduce to a negligible level the repeated thermal stresses of tension and compression applied to the one side of the bottom plate 2 as the package temperature rises or falls.

EXAMPLE 1

FIG. 2 shows an embodiment of the present invention. The package has a side plate 1 made of Mo (coefficient of linear expansion: $5.1 \times 10^{-6}$/K) having a thickness of 0.5 mm, two alumina members 5 (coefficient of linear expansion: $6.7 \times 10^{-6}$/K) having a thickness of 0.5 mm, and a bottom plate 2 made of SiC (coefficient of linear expansion: $3.7 \times 10^{-6}$/K) having a thickness of 0.6 mm. The dimensions of the package are 21 mm length, 10 mm depth, and 10 mm height. The tenons provided in the longitudinal direction have a width of 3 mm; the tenons provided in the depth direction, 2 mm.

Four segments of the side plate 1 were cut from a molybdenum plate with a thickness of 0.5 mm. The segments were provided with tenons. The four segments of the side plate 1 and the two pieces of the alumina members 5 were assembled and silver-soldered to form the frame shown in FIG. 1. The side plate's surfaces for bonding with the bottom plate 2 were plated with Ni (0.1 μm) and Au (0.5 μm) in order to increase the strength of bonding with the solder.

The package's electrode portions 4 were formed by bonding leads made of an Fe—Ni—Co alloy to the gold-plated portions 6 (streaked portions in FIG. 2) on the alumina members 5.

The bottom plate 2 was produced by filling and sintering a material powder in a metal mold provided by considering the shrinkage ratio of SiC at the time of sintering. The surface was plated with Ti (0.1 μm), Pt (0.2 μm) and Au (0.5 μm) for bonding with the side plate 1 in order to increase the strength of bonding with the solder.

Application of Au—Ge solder to the bonding portion between the side plate 1 and the bottom plate 2 and subsequent heating completed the assembly as shown in FIG. 2. The heating for the gold soldering was carried out at 400° C. for 30 minutes in a hydrogen gas furnace.

EXAMPLE 2

The package has a side plate 1 made of an Fe—Ni—Co alloy (coefficient of linear expansion: $5.3 \times 10^{-6}$/K) having a thickness of 0.5 mm, two alumina members 5 (coefficient of linear expansion: $6.7 \times 10^{-6}$/K) having a thickness of 0.5 mm, and a bottom plate 2 made of SiC (coefficient of linear expansion: $3.7 \times 10^{-6}$/K) having a thickness of 0.6 mm. The package's overall dimensions and the tenon's widths in the longitudinal and depth directions are the same as in Example 1.

Four segments of the side plate 1 were produced by heating a plate of an Fe—Ni—Co alloy, pouring the molten alloy into a mold, removing the formed plate from the mold, and giving it precision machining (cutting). The segments were provided with tenons. As with Example 1, the four segments of the side plate 1 and the two pieces of the alumina members 5 were assembled and silver-soldered to form a frame. The side plate's surfaces were plated with Ni (0.1 μm) and Au (0.5 μm) for bonding with the bottom plate 2. The package's electrode portions 4 were also formed. The Fe—Ni—Co alloy was superior in machinability in Example 1.

The bottom plate 2 was produced by processing an SiC plate having a thickness of 0.6 mm with a cutter and a laser. As with Example 1, the surface was plated with Ti (0.1 μm), Pt (0.2 μm) and Au (0.5 μm) for bonding with the side plate 1 Similarly, Au—Ge solder was applied to the bonding portion. The bottom plate 2 was coupled with the frame-shaped side plate 1 and then heated to complete the assembly work.

COMPARATIVE EXAMPLE 1

Figure 3:
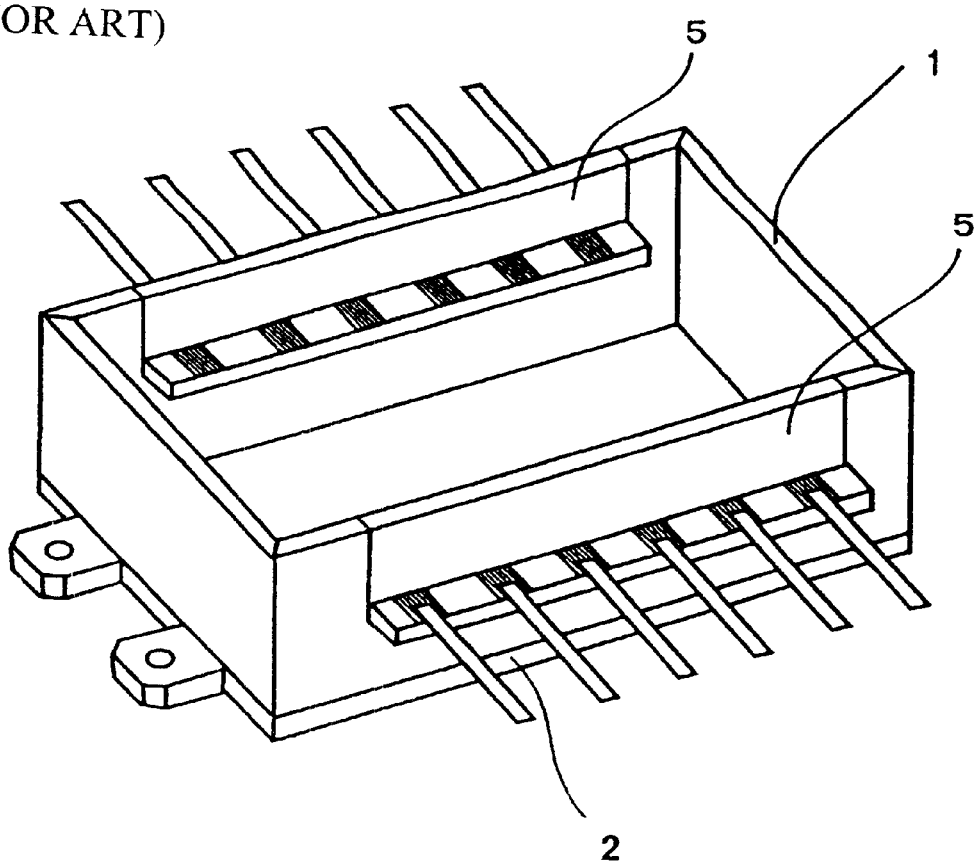
FIG. 3 is a perspective view illustrating the soldered bottom plate and side plate, having no tenons, of the prior art.

FIG. 3 is a perspective view for Comparative Example 1. The package has a side plate 1 made of an Fe—Ni—Co alloy (coefficient of linear expansion: $5.3 \times 10^{-6}$/K) having a thickness of 0.5 mm, two alumina members 5 (coefficient of linear expansion: $6.7 \times 10^{-6}$/K) having a thickness of 0.5 mm, and a bottom plate 2 made of a Cu—W alloy (coefficient of linear expansion: $6.5 \times 10^{-6}$/K) having a thickness of 0.6 mm. The package's overall dimensions are the same as in Examples 1 and 2. The side plate 1 and the bottom plate 2 were processed without providing tenons as shown in FIG. 3. They were assembled in a manner similar to that in Examples 1 and 2. The combination of a side plate of this type and a bottom plate of this type has been conventionally used.

COMPARATIVE EXAMPLE 2

The package has a side plate 1 made of an Fe—Ni—Co alloy (coefficient of linear expansion: $5.3 \times 10^{-6}$/K) having a thickness of 0.5 mm, two alumina members 5 (coefficient of linear expansion: $6.7 \times 10^{-6}$/K) having a thickness of 0.5 mm, and a bottom plate 2 made of SiC (coefficient of linear expansion: $3.7 \times 10^{-6}$/K) having a thickness of 0.6 mm. The package's overall dimensions and shape (having no tenon) are the same as in Comparative Example 1. The assembly work was carried out by a manner similar to that in Examples 1 and 2 and Comparative Example 1.

Table 1 shows the materials and the structure of the bonding portion employed in Examples 1 and 2 and Comparative Examples 1 and 2. Table 2 shows physical properties of the materials used.

TABLE 1

|  | Example 1 | Example 2 | Comparative Example 1 | Comparative Example 2 |
|---|---|---|---|---|
| Material |  |  |  |  |
| Side plate | Mo | Fe—Ni—Co | Fe—Ni—Co | Fe—Ni—Co |
| Bottom plate | SiC | SiC | Cu—W | SiC |
| Structure of bonding portion | With tenons | With tenons | Without tenons | Without tenons |

TABLE 2

|  | Side plate | | Bottom plate | |
|---|---|---|---|---|
|  | Mo | Fe—Ni—Co | SiC | Cu—W |
| Coefficient of linear expansion (/K) | $5.1 \times 10^{-6}$ | $5.3 \times 10^{-6}$ | $3.7 \times 10^{-6}$ | $6.5 \times 10^{-6}$ |
| Thermal conductivity (W/(m.K)) | 140 | 17 | 270 | 170 |

Fe—Ni—Co: an Fe—Ni (29 wt. %)-Co (16 wt. %) alloy.

The packages produced in the Examples and Comparative Examples were subjected to the measurement of the magnitude of warp and the hermetic seal test using He gas.

The magnitude of warp was measured by placing a package bottom-side up (the bottom plate being at the top) on a surface plate. The magnitude was determined by the difference between a maximum height and a minimum height measured by a precision stylus-type height meter (capable of measuring a magnitude of the order of micrometer).

Samples for the hermetic seal test were prepared by providing a lid to the packages produced in Examples 1 and 2 and Comparative Examples 1 and 2 by the following method: The lid was a plate made of alumina. The portion to be in contact with the side plate and the alumina members was plated with Ti, Pt, and Au in this order. Next, Au—Sn solder was sandwiched between the lid and the side plate and between the lid and the alumina members. Finally, the samples were heated at 300° C. for 10 minutes to complete the preparation.

The hermetic seal test was carried out by using a helium-pressurizing vessel and a helium leak detector. First, a package was left for one hour in the He-pressurizing vessel (with a helium gas atmosphere at 5 atm). Next, the package was removed from the He-pressurizing vessel. Then, the amount of He gas leakage from the package was measured by the He leak detector. In other words, the He gas that penetrated into the package while the package was in the He-pressurizing vessel was detected if the hermetic seal of the package was not completely.

Before the hermetic seal test, the packages were subjected to the following heat cycle process: A package was first kept at −65° C. for 30 minutes. Next, the temperature was increased to 150° C. in 10 minutes and maintained at 150° C. for 30 minutes. Then, the temperature was reduced to −65° C. in 10 minutes. This cycle was repeated 10 times.

The obtained test results of warp and leak rate of He gas are shown in Table 3.

TABLE 3

|  | Example 1 | Example 2 | Comparative Example 1 | Comparative Example 2 |
|---|---|---|---|---|
| Warp ($\mu$m) | 20 | 22 | 20 | 50 |
| Leak Rate of He Gas (atm.cm³/s) | Less than $1 \times 10^{-8}$ | Less than $1 \times 10^{-8}$ | Less than $1 \times 10^{-8}$ | About $5 \times 10^{-6}$ |

Note: the value in the table is an average value of five samples.

The materials of the side plate and bottom plate of Example 2 are the same as those of Comparative Example 2. Example 2, however, has a tenon structure at the bonding portion. Example 2 showed not only a warp as small as about 40% of that of Comparative Example 2 but also a smaller amount of leakage in the airtightness test than that of Comparative Example 2. These results demonstrate that the tenon structure in a package is notably effective in preventing warpage and in increasing leak rate of He gas.

Comparative Examples 1 and 2 have the same structure at the bonding portion; i.e., both have no tenon structure. The difference in the coefficient of linear expansion between the side plate and bottom plate of Comparative Example 1 is smaller than that of Comparative Example 2. The test results that this is attributable to Comparative Example 1 having less warpage and leakage than Comparative Example 2.

Heat generated by an LD is mostly conducted by the bottom plate to dissipate it to the outside of the package. As shown in Tables 1 and 2, the packages in Examples 1 and 2 with the bottom plate made of SiC have a thermal conductance as high as about 1.6 times that of Comparative Example 1, the bottom plate of which is made of a Cu—W alloy with a thickness of 0.6 mm, the same thickness as in Examples 1 and 2. Comparative Example 2 having the same bottom plate made of SiC with a thickness of 0.6 mm as in Examples 1 and 2 has no tenon structure. As a result, it is poor in leak rate as shown in Table 3. Hence, it cannot be used in actual application. The warpage and hermetic seal obtained on the package in Comparative Example 1, which has been conventionally used, are the practical criteria. The packages obtained in Examples 1 and 2 have the qualities equivalent to these criteria as shown in Table 3.

What is claimed is:

1. A package for an optical communications module, in which package a plurality of materials having a different coefficient of linear expansion are combined, wherein:
    (1) the package comprises a side plate for the package's side face and a bottom plate for the package's bottom face; and
    (2) the side plate and the bottom plate each have tenons at a bonding portion therebetween.

2. A package for an optical communications module as defined in claim 1, wherein:
    (1) the side plate is made of a material selected from the group consisting of Mo and an Fe—Ni—Co alloy; and
    (2) the bottom plate is made of an SiC-based ceramic material.

3. A package for an optical communications module as defined in claim 1, wherein the side plate is made of an Fe—Ni—Co alloy.

4. A package for an optical communications module as defined in claim 1, wherein said side plate has a first coefficient of linear expansion and said bottom plate has a second coefficient of linear expansion different from said first coefficient of linear expansion.

5. A package for an optical communications module as defined in claim 1, wherein said tenons and said bonding portions are substantially planar.

6. A package for an optical communications module as defined in claim 1, wherein said tenons and said bonding portions are planar.

7. A package for an optical communications module as defined in claim 1, wherein said bottom plate comprises SiC.

8. A package for an optical communications module as defined in claim 5, wherein said bottom plate comprises SiC.

9. A package for an optical communications module as defined in claim 8, wherein said side plate comprises Mo.

10. A package for an optical communications module as defined in claim 1, wherein said tenons and said bonding portions are provided at predetermined intervals along a circumference of said bottom plate and said side plate.

11. A package for an optical communications module in which package a plurality of materials having a different coefficient of linear expansion are combined, wherein:
- (1) the package comprises a side plate for the package's side face and a bottom plate for the package's bottom face;
- (2) the side plate and the bottom plate each have tenons at their bonding portion, and
  wherein the tenons have a width not less than 1 mm and not more than 5 mm.

* * * * *

UNITED STATES PATENT AND TRADEMARK OFFICE
CERTIFICATE OF CORRECTION

PATENT NO. : 6,464,409 B1
DATED : October 15, 2002
INVENTOR(S) : Ooe

It is certified that error appears in the above-identified patent and that said Letters Patent is hereby corrected as shown below:

<u>Title page,</u>
Item [*] Notice, "Subject to any disclaimer, the term of this patent is extended or adjusted under 35 USC 154(b) by (77) days", delete the phrase by "77 days" and insert -- by 0 days --

Signed and Sealed this

Fourteenth Day of October, 2003

JAMES E. ROGAN
*Director of the United States Patent and Trademark Office*